(12) United States Patent
Xu et al.

(10) Patent No.: US 9,137,319 B2
(45) Date of Patent: Sep. 15, 2015

(54) BROWSER PRIVACY MODE SUPPORT

(75) Inventors: Jimson Xu, San Francisco, CA (US); Deneb Meketa, Berkeley, CA (US); Ian G. Melven, San Francisco, CA (US); Matthew T. Wobensmith, San Francisco, CA (US); Jethro Villegas, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 945 days.

(21) Appl. No.: 12/755,935

(22) Filed: Apr. 7, 2010

(65) Prior Publication Data

US 2013/0167045 A1 Jun. 27, 2013

Related U.S. Application Data

(60) Provisional application No. 61/261,013, filed on Nov. 13, 2009.

(51) Int. Cl.
*G06F 21/53* (2013.01)
*H04L 29/08* (2006.01)
*G06F 21/62* (2013.01)

(52) U.S. Cl.
CPC ............ *H04L 67/22* (2013.01); *G06F 21/6263* (2013.01); *H04L 67/02* (2013.01); *H04L 67/289* (2013.01); *H04L 67/2842* (2013.01)

(58) Field of Classification Search
USPC ...................................................... 726/26–33
See application file for complete search history.

(56) References Cited

U.S. PATENT DOCUMENTS 5,974,549 A * 10/1999 Golan .............................. 726/23
2009/0222925 A1 * 9/2009 Hilaiel et al. .................... 726/25

OTHER PUBLICATIONS

Himber, Matthias et al., Bug 248970—(PrivateBrowsing) Private Browsing mode (global toggle for saving/caching everything), Jun. 28, 2004-Jul. 10, 2009, Mozillia, https://bugzilla.mozilla.org/show_bug.cgi?id=248970.*
Akhgari, Ehsan et al., Bug 468877—Expose the private browsing mode's current status and transitions through NPAPI, Dec. 10, 2008-Feb. 20, 2009, Mozilla, https://bugzilla.mozilla.org/show_bug.cgi?id=468877.*
"Privacy Mode" Wikipedia: The Free Encyclopedia, Wikipedia Foundation, retrieved Jan. 14, 2010, http://en.wikipedia.org/wiki/Private_browsing, 3 pages.

(Continued)

*Primary Examiner* — Matt Kim
*Assistant Examiner* — William Trapanese
(74) *Attorney, Agent, or Firm* — Wolfe-SBMC

(57) ABSTRACT

Methods, systems, and apparatus, including computer programs encoded on a computer storage medium, support a browser privacy mode in a plugin of the browser. In one aspect, a method includes applying a private browsing mode of a browser in a plugin program of the browser, the applying including: obtaining, in a process, an indication of the private browsing mode of the browser; specifying, in response to the indication, that an instance of the plugin program initiated within the process is set to run in a private data mode that cannot be exited; receiving, in the instance of the plugin program initiated within the process and set to run in the private data mode, information that results in locally cached data; and saving, in response to the receiving, the locally cached data entirely in volatile memory without saving to persistent storage.

20 Claims, 3 Drawing Sheets

(56) References Cited

OTHER PUBLICATIONS

"Microsoft Silverlight" Wikipedia: The Free Encyclopedia, Wikipedia Foundation, retrieved Jan. 14, 2010, http://en.wikipedia.org/wiki/Microsoft_Silverlight, 15 pages.

"Lessons Applets" The Java Tutorials>Deployment, retrieved Jan. 14, 2010, http://java.sun.com/docs/books/tutorial/deployment/applet, 2 pages.

"Private Browsing in Flash Player 10.1", Adobe Developer Connection, retrieved Mar. 10, 2010, http//www.adobe.com/devnet/flashplayer/articles/privacy_mode_fp10.1.html, 5 pages.

"How to Manage and Disable Local Shared Objects", retrieved Jan. 14, 2010, http//kb2.adobe.com/cps/526/52697ee8.html, 3 pages.

"Plugins:PrivateMode", MozillaWiki, retrieved Nov. 12, 2009, https://wiki.mozilla.org/Plugins:PrivateMode, 2 pages.

\* cited by examiner

BROWSER PRIVACY MODE SUPPORT

CROSS REFERENCE TO RELATED APPLICATIONS

This application claims the benefit of priority from U.S. Provisional Application Ser. No. 61/261,013, entitled "BROWSER PRIVACY MODE SUPPORT", filed Nov. 13, 2009, which is hereby incorporated by reference.

TECHNICAL FIELD

This specification relates to supporting a browser privacy mode.

BACKGROUND

A client-server environment is a network architecture in which clients generally rely on servers for resources, such as files, databases, devices, processing power, etc. The World Wide Web and its associated web servers and web browsers are a typical example of a client-server environment using an existing underlying network (e.g., the Internet) for communications. Web browsers can be used to obtain and render pages of data, which are stored as a Hypertext Markup Language (HTML) documents. Moreover, web browsers can have plugins, which are added programs that introduce new functionality to the browser program. Such plugins can employ shared objects, which can be read and written from within a given plugin of the browser (e.g., a multimedia player, which can render streaming media flows from one or more servers). Shared objects are typically used to read and store limited amounts of data on a user's computer or on a server. Local shared objects are similar to browser cookies and remote shared objects are similar to real-time data transfer devices. To use remote shared objects, a server, such as the Adobe® Flash® Media Server, is accessed.

Web browsers can provide a user with an option to use a private browsing mode that limits records of browsing history. This is distinct from a public browsing mode, where such limits may not be imposed, or be imposed to a lesser extent. In addition, web browsers can provide an application programming interface (API) that permits browsers to advise plugins of a private browsing mode.

SUMMARY

This specification describes technologies relating to supporting a browser privacy mode. Various innovative aspects of the subject matter described in this specification can be embodied in methods that include the actions of applying a private browsing mode of a browser in a plugin program of the browser, the applying including: obtaining, in a process, an indication of the private browsing mode of the browser; specifying, in response to the indication, that an instance of the plugin program initiated within the process is set to run in a private data mode that cannot be exited; receiving, in the instance of the plugin program initiated within the process and set to run in the private data mode, information that results in locally cached data; and saving, in response to the receiving, the locally cached data entirely in volatile memory without saving to persistent storage. Other embodiments of this aspect include corresponding systems, apparatus, and computer programs, configured to perform the actions of the methods, encoded on computer storage devices.

These and other embodiments can each optionally include one or more of the following features. Receiving the information can include receiving code that creates the locally cached data, and the caching can include caching in response to the code. The plugin program can include a media player, and the actions can include: preventing, in the instance of the plugin program initiated within the process and set to run in the private data mode, reading and writing of per-domain settings. Saving the locally cached data can include: using path information corresponding to where the locally cached data would be saved in the persistent storage in a public browsing mode of the browser to identify a location for the locally cached data in the volatile memory. Moreover, the using can include: adding the path information to a data structure in the volatile memory, where the data structure is accessible by each of multiple instances of the plugin program initiated within the process.

The actions can include: obtaining an indication of a public browsing mode of the browser; and specifying, in response to receiving the indication of the public browsing mode, that another instance of the plugin program is set to run in a public data mode that cannot be exited. In addition, the actions can include: invoking all network operations, initiated by the instance of the plugin program set to run in the private data mode, via the browser.

Various innovative aspects of the subject matter described in this specification can be embodied in a computer storage medium encoded with a computer program including instructions that when executed by data processing apparatus cause the data processing apparatus to perform operations of the described methods. In addition, various innovative aspects of the subject matter described in this specification can be embodied in a system including: a device; and one or more computers operable to interact with the device and to prevent persistence of local shared objects created by a plugin program of a browser during operation in a private browsing mode.

The one or more computers can consist of one computer running a web browser, the device can be a user interface device, and the one computer can include the user interface device. The one or more computers can include: volatile memory and persistent storage; and the one or more computers can be operable to perform the actions of the methods.

A browser plugin, such as a multimedia player, abides by the host browser's private browsing mode, where local data and browsing activity is not persisted locally. The browser removes local data generated in private browsing mode at the end of the private browsing session, including local data from the plugin program (e.g., images and videos downloaded by the multimedia player). In addition, the plugin program's locally shared objects can be cleaned up.

The private browsing mode designation can be applied to a shared object system of a plugin program. A browsing mode can be provided where local shared objects created during private browsing are not persisted when the user returns to public browsing mode. In some implementations, shared objects in a private mode session can be retained in a sandbox (e.g., a tightly-controlled set of resources provided for a program, including a temporary space allocation in memory, and limited or blocked access to network and input/output devices of the host system).

The systems and techniques described can operate with default per-domain permissions instead of reading and writing persistent per-domain permissions, which themselves are part of the permanent record that should not be created. Rather than reading per-domain permissions from disk, default per-domain permissions can be separately provided. Implementations should not hold records of websites visited in private browsing mode. Use of strict per-domain permissions is one such method of concealing the history of websites visited. Per-domain permissions can persist in some implementations. Per-domain permissions can be persistent for every session until a user decides to delete them. In the media player, these persistent per-domain settings can be maintained on disk in such a fashion that identifies a user's history. Private browsing should strive to hide the user's history in private browsing, and one such method performed in the media player can be to resort to using global defaults per-domain.

Particular embodiments of the subject matter described in this specification can be implemented so as to realize one or more of the following advantages. A private browsing mechanism can be provided that is both consistent across configurations and that need not compromise the security of a given host browser. Sharing of data between private and non-private browsing sessions can be avoided. A multimedia player (such as the FLASH® Player software provided by Adobe Systems Incorporated of San Jose, Calif.) can meet user expectations of privacy when in private mode. In some situations, there may be content breakage when browsing with the plugin in private mode, however, this is acceptable given that users expect to have some content break as a result of hiding some information.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
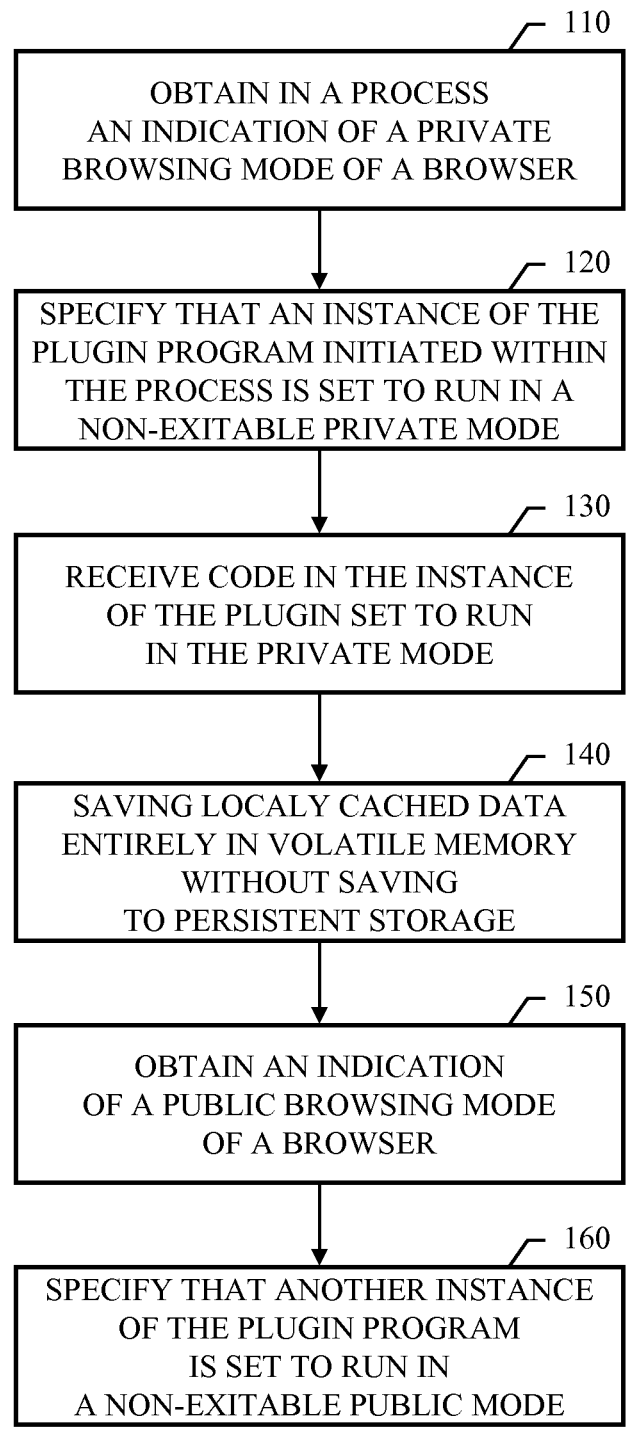
FIG. 1 is a flow chart showing an example of a method of applying a private browsing mode of a browser in a plugin program of the browser.

An electronic document (which for brevity will simply be referred to as a document) may, but need not, correspond to a file. A document may be stored in a portion of a file that holds other documents, in a single file dedicated to the document in question, or in multiple coordinated files. In addition, a "browser" refers to any program that provides a user the ability to access a graphical representation of hyperlinked resources residing in disparate parts of a computer network, and is not limited to a standalone web browser application, such as INTERNET EXPLORER® software, FIREFOX® software, SAFARI® software, CHROME software, and OPERA® software.

The description below provides details of various example implementations and does not require that any given implementation include all of the features or possible restrictions addressed below. The goals of the following example implementations include: (1) create a browsing mode where local shared objects created during private browsing are not persisted when the user returns to public browsing mode; (2) create a private browsing mechanism that is both consistent across configurations and does not compromise the security of a given host browser; and (3) minimizing complexity and cost in a given implementation. From a user's perspective, shared objects from public browsing mode are not accessible from private browsing mode, and vice versa. Shared objects created in private browsing are cleared when the private browsing session ends, and no browsing history is persisted locally. In addition, no domain specific settings need be used, but rather only global defaults.

The following are example use cases which relate to supporting a browser privacy mode. In use case A, after a user enters a private browsing mode, the user visits site A that uses local shared objects to remember (e.g., store) user login information. The user has local shared object(s) with the user's login information from a previous public browsing mode. Because of the change in mode, the user is required to re-enter login information.

In use case B, a user enters a private browsing mode and visits a new site B where no shared objects exist for the user. At site B, the user saves data into a shared object. The user leaves the private browsing mode and visits site B again in a public browsing mode. In this case, site B will not be able to find an existing shared object from the user and will only have default values.

In use case C, while in a private browsing mode, a user visits a site that supports animated and/or interactive multimedia content (e.g., a FLASH® site) and saves a shared object. The site (e.g., through a SWF file) continues to read and write to its shared object store as if it were coming from disk, even though it is not. The private browsing mode is set for a multimedia player (e.g., FLASH® Player) instance and cannot change for that player's lifetime (i.e., the time of operation for the given instance of the plugin program on a computer during browsing, until the instance is terminated, for whatever reason). Note that SWF is a file format, such as the SWF File Format Specification (Version 10) as published by Adobe Systems Incorporated of San Jose, Calif. The SWF file format delivers vector graphics, text, video, and sound over the Internet and is supported by Adobe® Flash® Player and Adobe AIR™ software.

In use case D, a user enters a private browsing mode and visits FLASH® site D. Previously, the user had stored some information at site D via shared objects. Assume the files (e.g., SWF files) at site D would normally show the previously saved information if the user clicks on the "Load Info" button. When the user now clicks on the button (in private browsing mode), the user only sees default values. When the user leaves private browsing mode, assuming the original tab with FLASH® site D is alive, and hits the "Load Info" button to reload the saved data, still no new information is found and only default values are shown.

In use case E, a user visits the same FLASH® site D from use case D in public browsing mode. The user enters private browsing mode, again assume the original tab with FLASH® site D is alive, and hits "Load Info" button. Now the previously saved information is retrieved and shown.

FIG. 1 is a flow chart showing an example of a method of applying a private browsing mode of a browser in a plugin program of the browser. An indication of the private browsing mode of the browser can be obtained 110 in a process. The process is assigned by a computer system for the plugin program to run in, and the process can be shared by multiple running programs (e.g., multiple instances of the same plugin program) or be dedicated to the running plugin program (e.g., a process in a multi-tasking operating system assigned solely to a specific instance of the plugin program). The obtaining can involve receiving the indication (e.g., receiving data pushed to the plugin by a web browser) or actively retrieving the indication (e.g., calling an API to obtain the indication).

The indication can be data specific to a given browser (e.g., a return result from a call to a browser-specific API) or data defined by a standard used by multiple browsers. Moreover, the plugin program can be designed to pursue more than one approach to obtaining the indication to maximize compatibility with multiple different browser programs.

In response to the indication, it can be specified 120 that the instance of the plugin program initiated within the process is set to run in a private data mode that cannot be exited. Each instance of the plugin program that is initiated in a computer system is a separate running program in the system, and the program can be written such that, upon start up, a determination is made as to whether or not to run in the private data mode. The plugin program is written such that, once this decision is made, it cannot be reversed for that instance of the plugin program. Thus, compliance with the requested private browsing mode can be ensured for the duration of operation of that plugin program instance. To switch back to public browsing mode, a new instance of the plugin program would be initiated (e.g., by refreshing the current page in a web browser).

In addition, a similar approach can be used for public browsing mode. For example, an indication of the public browsing mode of the browser can be obtained 150 (e.g., in another process assigned by the computer system for the plugin program to run in). As before, the process can be a shared or dedicated process, the obtaining can involve receiving the indication or actively retrieving the indication, and the indication can be data specific to a given browser or data defined by a standard used by multiple browsers. Moreover, the indication can be a default indication inherent in the program (i.e., the default assumption can be that the private mode is off).

In response to the indication of public browsing, it can be specified 160 that new instance of the plugin program is set to run in a public data mode that cannot be exited. Thus, the program can be written such that, upon start up, a determination is made as to whether or not to run in the public data mode, and once this decision is made, it cannot be reversed for that instance of the plugin program. To switch to private browsing mode, a new instance of the plugin program would be initiated. For example, in some implementations, while in public mode, a user can right click on SWF content and essentially reinstantiate a given instance into private mode by killing the current instance and launching a new instance within the same page to render the content using the private mode.

Code can be received 130, in an instance of the plugin program initiated within the process and set to run in the private data mode, that creates locally cached data. The plugin program can provide an execution environment in which one or more additional programs (e.g., bytecode) can run. These additional programs can be designed to generate local data in the course of operation that should be saved locally (i.e., at the computer system running the additional programs) for later use or sharing with other additional programs. For example, the locally cached data can include local shared objects, as discussed further below. This locally cached data can include state information for a running program, information about a user of the browser, information about user interactions with the browser, or a combination of these. Moreover, other types of locally cached data can be saved in response to information received by the instance of the plugin program initiated within the process and set to run in the private data mode, such as cached video or audio data in the case of the plugin program including a multimedia player.

In response to the code, the locally cached data can be saved 140 entirely in volatile memory without saving to persistent storage. Volatile memory is a memory device that requires power to maintain its state, such that when power to the device is interrupted, any saved data is lost due to the nature of the memory device itself. In contrast, persistent storage includes any storage device that is not dependent on supplied power to retain saved memory state, such as flash memory devices, magnetic disks (e.g., disks in an internal hard drive of the computer system), magneto-optical disks (e.g., a re-writeable DVD-ROM disk), etc. By saving the locally cached data entirely in volatile memory, without saving to persistent storage, the privacy of the saved data can be better assured. For example, if the computer crashes (while a user is surfing the Internet with a web browser in private browsing mode) and needs to be shut down, no private, locally cached data will be retained, since it will be lost upon loss of power to the volatile memory. Moreover, if only the browser program (with its plugin) crashes, the portion of the volatile memory allocated to the process in which the plugin runs will be released to the operating system of the computer and readily overwritten with new data by later processes.

Figure 2:
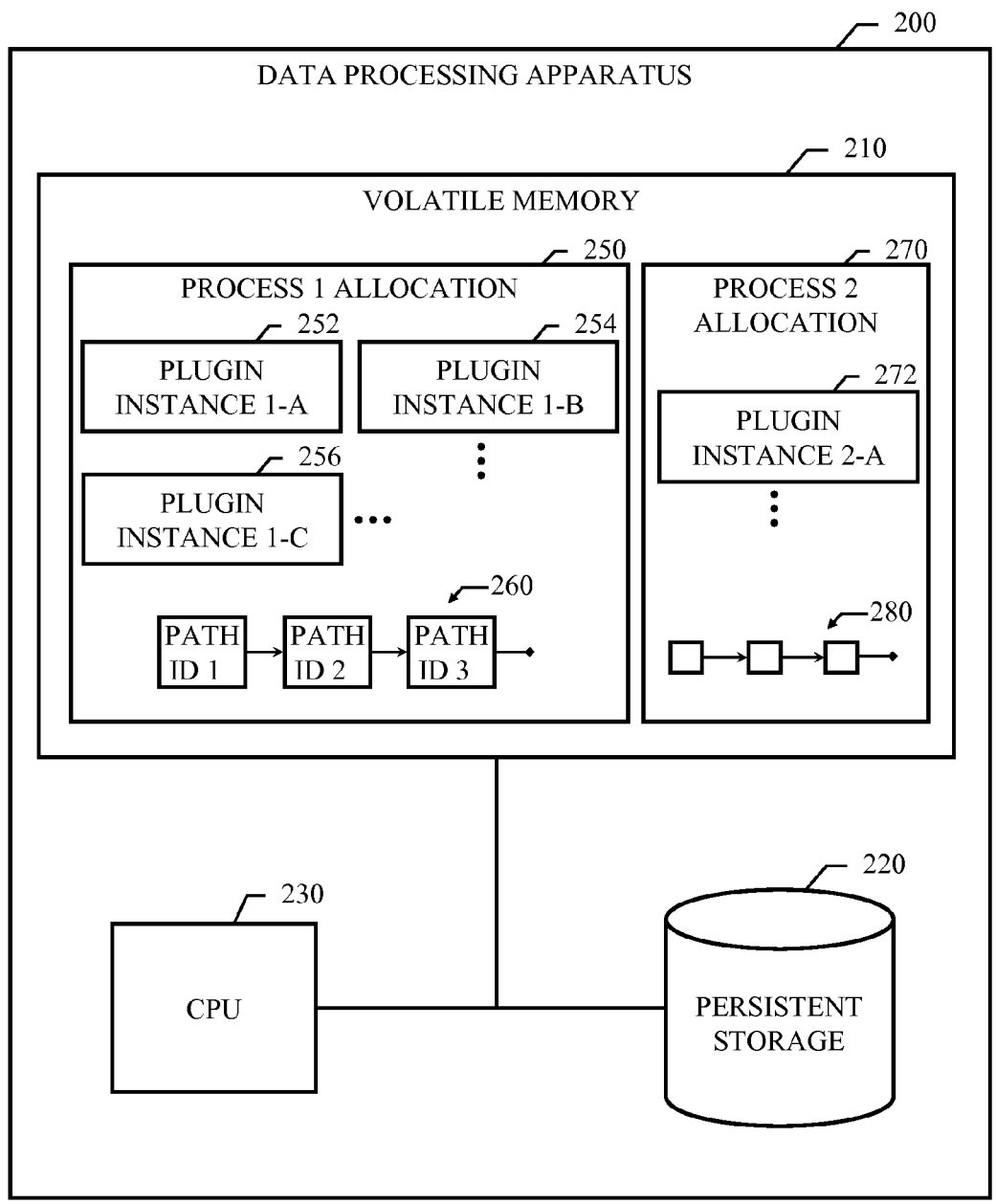
FIG. 2 shows an example of an apparatus in which a browser privacy mode is supported.

FIG. 2 shows an example of an apparatus in which a browser privacy mode is supported. A data processing apparatus 200 includes a volatile memory 210, a persistent storage 220, and a central processing unit (CPU) 230. When a first process is begun, it is provided with a memory allocation 250. This allocation 250 includes space to save both code and data for an instance 252 of a plugin program. The plugin instance 252 is initiated in private data mode, and thus stores locally cached data entirely within the allocation 250.

When doing so, the plugin instance 252 can use path information corresponding to where the locally cached data would be saved in the persistent storage 220 in a public browsing mode of the browser to identify a location for the locally cached data in the volatile memory. For example, when in public browsing mode, the plugin can save locally cached data (such as locally shared objects) in a particular directory in the file system of the apparatus 200 in the persistent storage 220, and the path of this particular directory (or at least portions thereof) can be used when saving the locally cached data in the volatile memory in the private data mode. This provides consistency in how the plugin handles locally cached data across both public and private data modes.

In addition, using the path information can include adding the path information to a linked list 260 in allocation 250 of the volatile memory 210. Each node in the linked list 260 can include an identifier that corresponds to path information into the persistent storage 220, even though the data is not stored in persistent storage 220 when in private data mode. Thus, data can be located in the linked list 260 by searching for path information in the identifier fields of the nodes in the linked list 260.

Note that a similar linked list 280 can be used in a second memory allocation 270 for a second process including a second instance 272 of the plugin running (this time) in the public data mode. However, in this case, the data in the linked list 280 is also stored in (and loaded from) the persistent storage 220. This locally cached data thus survives elimination of the allocation 270, and the linked list 280 is used for the faster in-memory operations performed by the plugin instance 272. Therefore, the plugin program can provide the same interface to any code that runs on the plugin program for accessing locally cached data, regardless of whether the public data mode or the private data mode is being used.

In addition, the linked list 260 can be accessible by each of multiple instances 252, 254, 256 of the plugin program initiated within the process in allocation 250 (e.g., an instance 254 loaded by the browser, and an instance 256 loaded by the instance 252). Likewise, the linked list 280 can be accessible by each of multiple instances of the plugin program initiated within the process in allocation 270. Further, the linked list 260 can be sandboxed for the first process, preventing the second process (or other processes) from accessing it. Note that different browsers handle processes differently. For example, the FIREFOX® software loads a new plugin binary into memory for each new browser window (a one-to-one browser window to binary image model), but in the INTERNET EXPLORER® software, some tabs share the same binary image of the plugin and others share a different plugin image. In addition, rather than linked lists 260 and 280, other types of data structures can also be used, such as hash tables, sorted arrays, etc.

Figure 3:
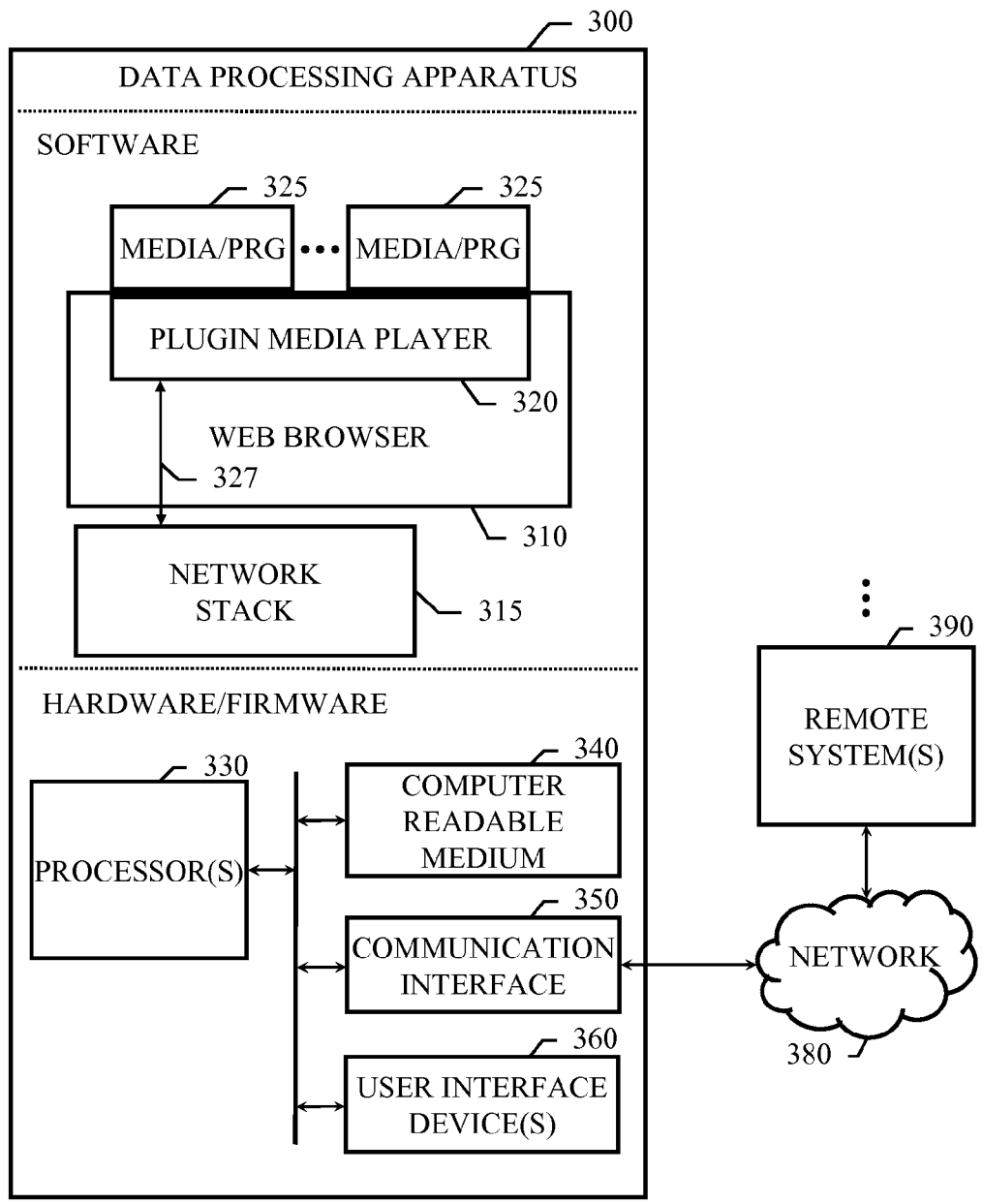
FIG. 3 shows an example of a system in which a browser privacy mode is supported.

FIG. 3 shows an example of a system in which a browser privacy mode is supported. A data processing apparatus 300 includes hardware/firmware, which provides the hardware platform, and software that runs on this hardware platform. The data processing apparatus 300 includes one or more processors 330 and at least one computer-readable medium 340. The data processing apparatus 300 can also include a communication interface 350, and one or more user interface devices 360.

The communication interface 350 provides access to one or more remote systems 390 (e.g., a server farm for a website) over a data communication network 380 (e.g., the Internet). Access to the communication interface 350 can be provided to various programs through a network stack 315, which represents one or more pieces of networking software implementing various networking protocols. The network stack 315 can be built into an operating system of the apparatus 300 or be a separate program.

The user interface device(s) 360 can include display screen(s), keyboard(s), mouse, stylus, other user input/output devices, or any combination thereof. Moreover, the data processing apparatus 300 can itself be considered a user interface device. Thus, the apparatus 300 represents multiple types of computing systems, including, for example, a personal computer running a web browser or a mobile telephone running a Wireless Application Protocol (WAP) browser.

The software includes a web browser 310 that uses the network stack 315 to access resources on the network 380. The web browser 310 includes a plugin media player 320, which is designed to process and display multimedia data (e.g., video, audio, and graphics data) within the web browser 310. The plugin media player 320 can define an execution environment that allows creation and presentation of user interface elements, storage and processing of locally cached data, and other operations by multiple programs 325, which can be included with media data provided to the plugin media player 320 for rendering to a display device 360. In addition, the plugin media player 320 can be designed such that, when it is initiated in the private data mode, all network operations 327 (including those initiated by the plugin media player 320 instance running in private mode and those initiated by the programs 325 operating on that instance of the plugin) are invoked via the browser 310. Thus, the plugin (e.g., media player 320) can rely on the host (e.g., web browser 310) to maintain the security of the network connections, HTTP (Hyper Text Transfer Protocol) or otherwise.

The execution environment of the plugin media player 320 can be a virtualization environment that works in conjunction with native services (e.g., an operating system) of the data processing apparatus 300 to provide a consistent well-defined environment in which programs can be loaded and executed. The execution environment can include facilities such as memory management (e.g., garbage collection), standard libraries, media decoders, user interface frameworks and input-output interfaces. Note that a program designed to run within an execution environment can often be developed rapidly because developers can rely on the consistency of the execution environment—even if the environment itself exists on widely varying hardware platforms.

In addition, the programs 325 can be provided in the form of an encoded representation having a predefined syntactic structure such as a programming language (e.g., source code) or can include well defined virtual instructions (e.g., platform-independent bytecode, such as Macromedia Flash® bytecode). The execution environment of the plugin media player 320 can decode the encoded representation of the program 325 into instructions and can execute the instructions of the program 325. When the execution environment of the plugin media player 320 is designed as a virtualization environment in this manner, it can also be referred to as an interpreter or virtual machine. In addition, such an execution environment often includes a runtime library that provides various utility services (e.g., string manipulation, networking, graphics, addressing peripherals, or other types of functionality) for use by the programs 325.

Various instances of the plugin media player 320 can be loaded by the web browser 310, such as described above in connection with FIG. 2. Note that various web browsers can handle this loading in various ways when transitioning to private browsing mode. For example, some web browsers will use a new, empty allocation to reload all content, but other web browsers will migrate parts of the public browsing session into the private browsing session so there is less breakage of content. In contrast, the plugin media player 320 is designed such that, once a particular instance of the player 320 has been initialized, in either public or private mode, it cannot change its mode.

The plugin media player 320 can determine whether the web browser 310 is in public or private browsing mode at the time of loading of an instance of the plugin media player 320, and then set its own data mode accordingly, such that persistence of locally cached data is prevented during operation in a private browsing mode. Locally cached data can include local shared objects created by the plugin media player 320 by a local shared object (LSO) system of the plugin media player 320. In addition, the LSO system can be used to manage player settings and user content settings for the plugin media player 320.

The player settings correspond to default settings for the plugin media player 320 overall, and the user content settings correspond to user specified settings for particular accessed resources. Both types of settings can be scoped to domains (e.g., the top level domain of a website accessed over the Internet), and all settings can be written based on the domain that the content was served from, where web content from a default domain (e.g., the domain of the software provider for the plugin media player 320) can be treated as preferences for the plugin media player 320. In some media player implementations, web content can never apply settings for the plugin, and users can modify settings for a specific domain using the control panel provided by the media player using the settings UI and settings manager panels. When instances of the web browser 310 and the plugin media player 320 are in the private mode, the plugin media player 320 can be restricted to use of only player settings (i.e., no user content settings can be set). Thus, in such implementations, if the user wants to change settings of the player 320, they have to make global changes to the player 320, and all user-specific settings are ignored. Various details of such implementations are now provided.

A Settings UI/Manager lets one manage global privacy settings, storage settings, security settings, and automatic notification settings by using different panels. The Settings Manager can ignore private shared objects and only handle public shared objects. In other words, the Settings Manager does exactly the same thing regardless of private browsing being on or off. Global settings are still read and written as usual, and always on disk. In some implementations, no per-domain settings are read or written, neither in memory nor on disk. Instead, the global per-domain defaults are applied to all domains, and cannot be changed. In other implementations, Settings Manager can be used to read and write some per-domain settings, but these per-domain settings will not affect private LSOs and they will be ignored when in private browsing.

Various consequences can result from having no domain specific settings. For example, this can prevent the user from accessing the privacy and storage tabs (Settings UI will hide the privacy and storage tabs; the Settings UI can be a control center specific to a SWF that allows users to change settings, such as privacy, data storage, and security, and the Settings UI (also known as the settings panel) can be accessed in some implementations by right clicking a SWF running in FLASH® Player and selecting "Settings . . . "). A scripting routine for showing setting (e.g., ActionScript show-Settings( )) may not show the privacy and storage tabs; if they are requested, the default panel (video display) is shown. Global settings remembers the last Settings UI panel the user was on; if last panel is privacy or storage, the default panel (video display) can be shown. The P2P (Peer-to-Peer) pop-up will typically have the "remember" checkbox hidden. When a SWF attempts to exceed its quota, no pop-up may appear to request an increase and the operation may simply fail silently. These changes may all be necessary as these settings may be retained only through domain specific settings.

The global defaults may be an already-existing concept managed by the Settings Manager. There can be "default defaults" to which the global defaults are initially set. For example, camera, microphone and P2P can each default to "always ask"; users can select "always deny" instead if they want (these are permission settings that allow a user to grant or deny respectively, camera, microphone, or Peer-to-Peer, access to SWFs). Storage can default to 100K; in some cases, users can select from zero to infinite instead.

In order to activate the feature, in some implementations, the developer need not do anything. For example, a FLASH® user can simply put the supported browser into private browsing mode, and the FLASH® Player software can detect (on supported browsers) that private browsing mode has been enabled. All subsequent FLASH® Player instances will enter private browsing mode until the user leaves private browsing mode.

In addition, it is important that the private LSOs be cleaned up properly after the private browsing session. For example, if the multimedia plugin crashed when in private browsing, at the very least, the private LSOs should be cleared once the plugin starts again.

Other types of "persistence" such as local connections, sockets and network streams can be handled separately, outside of the context of persistent local data. The player's own asset cache (e.g., used to cache the FLEX™ framework and other signed assets) need not be affected. Also, INTERNET EXPLORER® 8 software's "InPrivate Filtering" (a mechanism that regulates content from non-first-party domains) can also be handled separately.

The following description provides examples of detailed design implementations for browser interfacing in some implementations. In FLASH® Player implementations, the core changes can include defining a new feature for platform specific build files. In addition, the CorePlayer can have a privacy mode state: bool m_isInPrivateBrowsing. This state can be used to determine if the CorePlayer of interest is in private browsing.

In a WINDOWS® INTERNET EXPLORER® 8 software implementation, one can call LoadLibrary(TEXT("ief-rame")) and IEisInPrivateBrowsing( ) in CShockwave( ) to decide how to initialize CorePlayer::m_isInPrivateBrowsing.

In the case of NPAPI (Netscape Plugin Application Programming Interface) compatible browsers, the PlatformPlayer's browsing state can be set in NPP_New( ) when creating the PlatformPlayer instance. In this function, the browser can be queried via NPN_GetValue( ) for NPPVprivateModeBool, which will modify CorePlayer::m_isInPrivateBrowsing. Further details regarding the new NPAPI are provided below.

Plugins should assume that private mode is off by default. When the browser turns private mode on it will call NPP_SetValue for "NPNVprivateModeBool" (assigned enum value 18) with a non-null value for the argument pointer on all applicable instances. Plugins should check the boolean value pointed to, not the pointer itself. When the browser turns private mode off it will call NPP_SetValue for "NPNVprivateModeBool" with a false value for the pointer value on all applicable instances. Plugins can query the browser for private mode state by calling NPN_GetValue for the variable "NPNVprivateModeBool". This allows instances to know about private mode state before opening any streams. Changes in private mode affect new streams only—not previously created streams.

The following description provides examples of detailed high level design options, in some implementations. Public LSOs are read off from disk (if they exist) and copied into the LSO object. Changes made to the copy do not affect the LSO on disk until writing occurs, such as via a direct call to flush( ). By maintaining a concept of a disk, consistent behavior can be maintained between private and public LSOs. In private browsing, one can use the concept of a "disk" in memory that only survives as long as the FLASH® Player library is loaded in the browser.

This "disk" in memory can be implemented via a global linked list of nodes. For example, these nodes can be structured as follows (using C++ pseudo code):

```
class SharedObjectDataNode
{
public:
    // constructor copies all given values to member variables
    SharedObjectDataNode(const SharedObject* so, const BYTE* data,
unsigned int dataLen);
    ~SharedObjectDataNode( );
    // is this node equivalent to the given so?
    // check to see nameKey and security status matches
    bool IsEquivalentOf(const SharedObject* so);
    // is this node from the given domain?
    bool IsFromDomain(const char* domain) { return
StrEqual(m_domainPath, domain);
}
    // replace the node's data with the given data and length. Simply
performs a copy of the given data.
    void ReplaceData(const BYTE *data, unsigned int len);
    BYTE* GetCopyOfData( );
```

```
    unsigned int GetLength( ) { return m__dataLen; }
    SharedObjectDataNode *next; // pointer to next node private:
    char* m__nameKey; // same nameKey used to identify SharedObjects
    char* m__domainPath; // used when computing disk usage for a
domain
    BYTE* m__data; // serialized form of SharedObject's data variable
    unsigned int m__dataLen;
    bool m__isSecure;
};
```

The SharedObjectDataNode is not a SharedObject itself. Instead, it embodies a SharedObject's data variable in serialized form. The beauty of creating such a node means the existing serializer routines can be reused in the player code. The list itself can be embodied in a new singleton class, PrivateSharedObjects defined, for example, by the following pseudo code:

```
// Singleton class that manages internal list of private shared objects.
// One class should own this singleton class.
class PrivateSharedObjects
{
public:
    static void Init( );
    static void Destroy( );
    static PrivateSharedObjects *GetInstance( )
    {
        if (!m__instance)
            Init( );
        return m__instance;
    }
    // returns a reference to an equivalent LSO in
m__privateSharedObjectList, or NULL if not found.
    SharedObjectDataNode* Search(const SharedObject* );
    // Append a copy of the given shared object to private shared object
list.
    // 'data' is the serialized form of "so"'s data variable
    // All data is copied into the list.
    void AppendCopy(const SharedObject* so, const BYTE* data,
unsigned int dataLen);
    // remove "so" from private shared object list
    void Delete(const SharedObject* so);
    // given a domainPath, will search the private shared object list for
all LSOs from that domain,
    // sum up their sizes, and return the result in bytes
    offset__t ComputeDiskUsageForDomain(const char* domainPath);
private:
    static PrivateSharedObjects *m__instance;
    // a global list of private shared objects. We use this as a "disk" in
    // memory when handling shared objects in private browsing. This
    // mimics public browsing, which uses the physical disk to read/init
    shared objects.
    SharedObjectDataNode *m__privateSharedObjectList;
    SharedObjectDataNode *m__privateSharedObjectTail; // tail of list for
faster appending
    static PlatformCriticalSection *m__pCriticalSection;
    PrivateSharedObjects( );
    ~PrivateSharedObjects( );
};
```

CoreGlobals (a C++ class that owns all global objects) is the owner of PrivateSharedObjects and initializes and destructs it. With the disk structure complete, the low level writing and reading functions can be modified to take a different path if in private browsing. In some implementations, the modified functions are SharedObject::UpdateClient( ) and SharedObject::LoadFile( ) respectively.

For reading using SharedObject::LoadFile( ), the global PrivateSharedObjectList can be read when calling SharedObject.getLocal( ) from ActionScript. In private browsing, instead of loading from the file on disk, the global PrivateSharedObjectList can be searched for the SharedObject desired. If one is found, the serialized data from the node can be parsed and read it into this SharedObject.

For writing using SharedObject::UpdateClient( ), writing data to the global SharedObjectList can be a little more complicated. There can be effectively two different types of writing: 1) Actually writing modified data to disk; 2) Writing an empty LSO, which equates to deleting it from disk.

SharedObject.flush( ), SharedObject.close( ), and garbage collected SharedObject references are all ways of writing data to disk. SharedObject.clear( ) deletes LSOs. All of these writes can be done in SharedObject::UpdateClient( ). After the domain disk usage check, which can be done to ensure the disk usage quota for the hosting domain of the requesting SWF has not been exceeded, private mode specific actions can be performed.

To address the first point of writing data, the following can be done: 1) search the global PrivateSharedObjectList for this SharedObject; 2) if found, serialize out this SharedObject and copy the raw bytes into the found node; 3) else add this SharedObject to the global PrivateSharedObjectList.

Finally, to address the LSO deletion case, two steps can be performed: 1) if this SharedObject is empty; 2) search the global PrivateSharedObjectList for this SharedObject and delete it if found.

The following is a detailed implementation design for changes to the Settings UI/Manager in some implementations. The goal here is to prevent the user from accessing the privacy and storage tabs. There are three ways to access the privacy and storage tabs: graphical UI via Settings UI; ActionScript interface showSettings( ); and the player settings shared object, which saves the last panel the user was on.

To address the graphical UI case, a new property, isPrivate, can be added to the input state object that is passed to the SettingsUI SWF. This new property can be used by SettingsUI to determine the browsing state. In SettingsManager::HandleSettingsDialog( ), the property can be set to the current player's browsing state. In SettingsUI's movie initializer, the browsing state can be checked via inputState.isPrivate and if in private browsing, the privacy and storage tabs can be hidden.

The other cases can be addressed by modifying SettingsUI goPanel( ) function which jumps to a specific panel. If it is detected that the Privacy or Storage panel is selected, the default video display panel can be jumped to.

The goal for the P2P pop-up will be to have the "remember" checkbox hidden. Pop-up dialogs have different initializer in player code. The inputState.isPrivate in SettingsManager::CommonSecurityPopupInit( ) is also set. Similarly, this state can be checked in SettingsUI's P2P pop function and hide the "remember" checkbox.

The goal is that, when a SWF attempts to exceed its quota, no pop-up appears to request an increase and the operation fails silently. The SettingsManager::RequestDiskUsageLimit( ) can be modified so that, when in private browsing, the software returns to the callback function without bringing up the pop-up dialog.

For global default settings, one should avoid calling SetDomainSetting( ) in private browsing. A check can be placed in SetDomainSetting( ) to assert and bail if this function is found to be executing when in private browsing. GetDomainSetting( ) can be modified to retrieve player global default settings for private browsing.

For the ActionScript API, the AS1/2 System.showSettings( ) and AS3 Security.showSettings( ) may not be able to bring up Privacy and Storage panels in private browsing. Moreover, for error handling and recovery, no new exceptions need be added. The existing exceptions can be employed and handled in the same manner.

Various implementations of the systems and techniques described here are dependent on the browser vendors who use the NPAPI. Thus, they should make modifications to their browsers (e.g., FIREFOX® software, CHROME software, SAFARI® software, and OPERA® software) to support the new NPAPI that informs plugins of private browsing status. This NPAPI is used to know which instance of the player to create with private browsing mode on and which with private browsing mode off. Note that IE8 already provides a means to query private browsing mode status.

Some FLASH® content that tries to save session state will be broken as locally persistent SharedObjects will no longer exist in private browsing mode. In some configurations of some implementations, a "LocalFileReadDisable" property can be turned on. This property means "Disable read access to files on local drives." SharedObjects created in private browsing mode never exist on the local disk. Even so, conceptually, that is how SharedObjects are understood to be, i.e. locally persistent data. This feature makes SharedObjects more restrictive, not less. Therefore, SharedObjects in private browsing mode will abide by the existing rules and be disabled if this property is enabled.

In some implementations, the browsing mode is scoped to a particular plugin (e.g., a multimedia player) instance. So it is possible for certain tabs with plugin content to be in private browsing mode and others to be in public browsing mode. The only limitation is that once the plugin instance is created (can also be viewed as per webpage), the browsing mode cannot change.

In addition, in some cases, more flexibility can be provided when it comes to private browsing mode state. For example, rather than forcing a plugin (e.g., a multimedia player) instance to be in one state, existing instances of the plugin can be provided the ability to change their private browsing mode state. Note that there is divergence amongst the browsers currently in use. Many browsers cannot change privacy state on the same page. Some browsers notify the plugin of privacy state via a push model, and some browsers, the plugin queries the browser for privacy state via a pull model. The systems and techniques described here can support both approaches to provide wide compatibility with existing browser programs.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising: applying a private browsing mode of a browser in a plugin program of the browser, the applying comprising:

obtaining an indication of the private browsing mode of the browser, said obtaining, in a process that is compatible with multiple different browser programs, browser-specific data for the indication of the private browsing mode of the browser;

specifying, in response to the indication and the browser-specific data, that an instance of the plugin program initiated within the process is set to run in a private data mode that cannot be exited for a duration of operation of the plugin program instance;

receiving, in the instance of the plugin program initiated within the process and set to run in the private data mode, information that results in locally cached data; and saving, in response to the receiving, the locally cached data entirely in volatile memory without saving the locally cached data to persistent storage effective to prevent access to the locally cached data in the volatile memory from another process.

2. The method of claim 1, where the plugin program comprises a media player, the method comprising:

preventing, in the instance of the plugin program initiated within the process and set to run in the private data mode, reading and writing of per-domain settings.

3. The method of claim 1, where saving the locally cached data comprises:

using path information corresponding to where the locally cached data would be saved in the persistent storage in a public browsing mode of the browser to identify a location for the locally cached data in the volatile memory.

4. The method of claim 3, where the using comprises:

adding the path information to a data structure in the volatile memory, where the data structure is accessible by each of multiple instances of the plugin program initiated within the process.

5. The method of claim 1, comprising:
obtaining an indication of a public browsing mode of the browser; and
specifying, in response to receiving the indication of the public browsing mode, that another instance of the plugin program is set to run in a public data mode that cannot be exited.

6. The method of claim 1, comprising:
invoking all network operations, initiated by the instance of the plugin program set to run in the private data mode, via the browser.

7. A computer storage medium encoded with a computer program, the program comprising instructions that when executed by data processing apparatus cause the data processing apparatus to perform operations comprising:
obtaining, in a process including a plugin program of a browser, an indication of a private browsing mode of the browser, the process being compatible with multiple different browser programs and said obtaining browser-specific data for the indication of the private browsing mode of the browser;
specifying, in response to the indication and the browser-specific data, that an instance of the plugin program initiated within the process is set to run in a private data mode that cannot be exited for a duration of operation of the plugin program instance;
receiving, in the instance of the plugin program initiated within the process and set to run in the private data mode, code that creates locally cached data; and
saving, in response to the code, the locally cached data entirely in volatile memory without saving the locally cached data to persistent storage effective to prevent access to the locally cached data in the volatile memory from another process.

8. The computer storage medium of claim 7, where the plugin program comprises a media player, the operations comprising:
preventing, in the instance of the plugin program initiated within the process and set to run in the private data mode, reading and writing of per-domain settings.

9. The computer storage medium of claim 7, where saving the locally cached data comprises:
using path information corresponding to where the locally cached data would be saved in the persistent storage in a public browsing mode of the browser to identify a location for the locally cached data in the volatile memory.

10. The computer storage medium of claim 9, where the using comprises:
adding the path information to a data structure in the volatile memory, where the data structure is accessible by each of multiple instances of the plugin program initiated within the process.

11. The computer storage medium of claim 7, the operations comprising:
obtaining an indication of a public browsing mode of the browser; and
specifying, in response to receiving the indication of the public browsing mode, that another instance of the plugin program is set to run in a public data mode that cannot be exited.

12. The computer storage medium of claim 7, the operations comprising:
invoking all network operations, initiated by the instance of the plugin program set to run in the private data mode, via the browser.

13. A system comprising:
a device; and
one or more computers operable to:
interact with the device and to prevent persistence of local shared objects created by a plugin program of a browser during operation in a private browsing mode that is determined from an indication of the private browsing mode and browser-specific data obtained from the browser by a process that is compatible with multiple different browser programs to obtain the browser-specific data for the indication of the private browsing mode of the browser;
specify, in response to the indication, that an instance of the plugin program initiated within the process is set to run in a private data mode that cannot be exited for a duration of operation of the plugin program instance; and
prevent another process from accessing the local shared objects created by the plugin program.

14. The system of claim 13, wherein the one or more computers consist of one computer running a web browser, the device is a user interface device, and the one computer comprises the user interface device.

15. The system of claim 13, where the one or more computers comprise:
volatile memory and persistent storage; and
the one or more computers are operable to:
obtain, in a process including the plugin program of the browser, an indication of the private browsing mode of the browser;
receive, in the instance of the plugin program initiated within the process and set to run in the private data mode, information that causes creation of the local shared objects; and
save, in response to the information, the local shared objects entirely in the volatile memory without saving to the persistent storage.

16. The system of claim 15, where the plugin program comprises a media player, and the one or more computers are operable to prevent, in the instance of the plugin program initiated within the process and set to run in the private data mode, reading and writing of per-domain settings.

17. The system of claim 15, where the one or more computers are operable to save the local shared objects using path information corresponding to where the local shared objects would be saved in the persistent storage in a public browsing mode of the browser to identify a location for the local shared objects in the volatile memory.

18. The system of claim 17, where the one or more computers are operable to add the path information to a data structure in the volatile memory, the data structure is accessible by each of multiple instances of the plugin program initiated within the process, and the plugin program provides a same interface to code that runs on the plugin program for accessing the local shared objects regardless of public or private browsing mode use.

19. The system of claim 15, where the one or more computers are operable to:
obtain an indication of a public browsing mode of the browser; and
specify, in response to receiving the indication of the public browsing mode, that another instance of the plugin program is set to run in a public data mode that cannot be exited.

20. The system of claim 15, where the one or more computers are operable to invoke all network operations, initiated by the instance of the plugin program set to run in the private data mode, via the browser.

* * * * *